US010488675B2

(12) United States Patent
Wildsmith et al.

(10) Patent No.: US 10,488,675 B2
(45) Date of Patent: Nov. 26, 2019

(54) LENS EDGE FEATURES FOR DETERMING LENS PLACEMENT AND ALIGNMENT

(71) Applicant: Johnson & Johnson Vision Care, Inc., Jacksonville, FL (US)

(72) Inventors: Christopher Wildsmith, Jacksonville, FL (US); Michael F. Widman, Jacksonville, FL (US)

(73) Assignee: Johnson & Johnson Vision Care Inc, Jacksonville, FL (US)

( * ) Notice: Subject to any disclaimer, the term of this patent is extended or adjusted under 35 U.S.C. 154(b) by 234 days.

(21) Appl. No.: 15/063,005

(22) Filed: Mar. 7, 2016

(65) Prior Publication Data
US 2017/0255024 A1 Sep. 7, 2017

(51) Int. Cl.
*G02C 7/04* (2006.01)
*G02C 7/02* (2006.01)

(52) U.S. Cl.
CPC ............. *G02C 7/047* (2013.01); *G02C 7/021* (2013.01); *G02C 7/048* (2013.01)

(58) Field of Classification Search
CPC . G02C 7/047–049; G02C 7/021; G02C 7/024
USPC ............ 351/159.02–159.14, 159.28, 159.36, 351/159.47, 159.41, 159.74, 159.8, 178
See application file for complete search history.

(56) References Cited

U.S. PATENT DOCUMENTS

| 5,044,742 A | 9/1991 | Cohen | |
|---|---|---|---|
| 6,340,229 B1 | 1/2002 | Lieberman et al. | |
| 7,441,892 B2 * | 10/2008 | Hsu | G02C 7/04 351/159.02 |
| 8,636,357 B2 | 1/2014 | Chehab et al. | |
| 9,696,564 B1 * | 7/2017 | Etzkorn | G02C 7/04 |
| 2008/0161912 A1 * | 7/2008 | Scott | A61F 2/1616 623/6.11 |
| 2013/0215375 A1 * | 8/2013 | Belden | G02C 7/04 351/159.02 |

FOREIGN PATENT DOCUMENTS

GB        1463107 A    2/1997

OTHER PUBLICATIONS

PCT Search Report for PCT/US2017/021078 dated May 30, 2017.

* cited by examiner

*Primary Examiner* — Travis S Fissel (57) ABSTRACT

A contact lens having a lens edge defining an outer periphery of the contact lens, an optic zone positioned within the lens edge designed to provide corrective vision for a patient, a Lens Center having a vertical axis and a horizontal axis passing therethrough, and first and second fiducial indicators present at first and second different locations around the lens edge. The first and second fiducial indicators each include at least one recess into or at least one projection extending outwardly from the lens edge and are different from one another.

17 Claims, 7 Drawing Sheets

LENS EDGE FEATURES FOR DETERMING LENS PLACEMENT AND ALIGNMENT

FIELD OF USE

The present invention relates generally to field of contact lenses, and more specifically to lenses having edge features that facilitate assessing lens alignment and/or proper placement of a lens on a patient's eye.

BACKGROUND OF THE INVENTION

The use of contact lenses to correct vision is common place in today's world. There are presently several traditional methods of high-volume low-cost contact lens manufacture. These methods include, but are not limited, to cast molding, spin casting, lathing, and using a technique known in the industry as "Lightstream Technology", and any combinations thereof.

More recently, a new system and method for manufacturing contact lenses has been disclosed in which an infinite number of truly custom lenses can readily be produced in a cost effective manner. U.S. Pat. No. 8,317,505, which is incorporated herein by reference in its entirety, discloses a method for growing a Lens Precursor Form on a single male optical mandrel on a voxel by voxel basis by selectively projecting actinic radiation through the optic mandrel and into a vat or bath of liquid polymer. The optical mandrel and Lens Precursor Form are then removed from the vat and inverted so that the convex surface of the optic mandrel is upright. Following a dwell period during which uncured residual liquid monomer from the bath that remains on the Lens Precursor Form flows under gravity over the Lens Precursor Form, such liquid is then cured to form the final lens. As described therein, a truly custom lens can be produced for any given eye.

To maximize the benefit to a patient of a truly custom lens manufactured as set forth in U.S. Pat. No. 8,317,505 or otherwise, requires precision in both measuring a patient's corrective needs to design the custom lens, and also in assessing the actual fit of the lens on the patient's eye and adjusting the design accordingly to account for Lens Position Error. With regard to the latter, it is well known that the physiology of the patient's eye itself, of the patient's eyelid, and the interaction between the two can affect the actual positioning of the lens upon the eye. Often these factors result in a lens orienting itself upon the eye in a less than optimal manner, such as laterally offset from the intended position or at an angular orientation relative to what was intended. This results in less than optimal vision through that lens since the optic zone of the lens is not oriented appropriately over the patient's eye. If the precise fit of the lens on the patient's eye can be assessed accurately, then the custom lens can be redesigned to account for Lens Position Error, such as by moving the optic zone accordingly, yielding a truly custom lens that better corrects the patient's vision in the real setting as opposed to a hypothetical design setting.

In assessing a patient's vision, it is still commonplace for eye care practitioners to utilize a simplistic, well-known slit lamp. Known prior art has leveraged markings on a fitting lens to assist practitioners in assessing the actual fit of a contact lens on a patient's eye when using a slit lamp or otherwise additional manufacturing step to place them there, such as milling, scribing or stamping. Other methods of placing these types of markings on a lens include ink jet printing, pad printing or the like. Another method is to subsequently add or remove material from the lens such as is These markings are placed on the front or back curve of the lens, and require an disclosed in U.S. Pat. No. 8,636,357. The cost and complexity or these additional manufacturing steps increases the cost of any lens having such fiducial markings.

The present invention provides a lens having edge features that are designed to be visible to a practitioner and enable fitting assessment using a traditional slit lamp, or any other type of more sophisticated device, and require no further steps in the manufacturing process. The edge features disclosed herein are further advantageous in that they are visible to the bare eye when in hand and enable a patient to readily verify the correct orientation of the lens before placing it on the eye, such as by visualizing whether the lens is upside down or right-side up, or whether the lens has inverted or turned inside-out. Further, the lens edge features described herein are preferably positioned outside of the optic zone and as such are not readily visible to the patient or any other casual observer when placed on the eye, rendering them suitable for normal, everyday use by a patient, thereby eliminating the need for specialized trial lenses.

SUMMARY OF THE INVENTION

Described herein is a contact lens having a lens edge defining an outer periphery of said contact lens, an optic zone positioned within the lens edge designed to provide corrective vision for a patient, a Lens Center having a vertical axis and a horizontal axis passing through it, and first and second fiducial indicators present at first and second different locations around the lens edge. The first and second fiducial indicators each include at least one recess into or at least one projection extending outwardly from said lens edge and being different from one another. According to one embodiment, the first fiducial indicator includes at least one recess and said second fiducial indicator includes at least one projection.

The first fiducial indicator may be a first recess in said lens edge extending between first and second points along the lens edge, and the second fiducial indicator may be second and third recesses in said lens edge positioned substantially adjacent one another and between third and fourth points around the lens edge.

According to one embodiment, the first and second points are located on a first lateral side of the vertical axis within an angle $\beta$ of 3-25 degrees measured relative to the Lens Center. Further, the third and fourth points are located on an opposite side of the vertical axis from the second and third points and within an angle $\gamma$ of 6-50 degrees measured relative to the Lens Center.

In one embodiment, the first point is positioned an angle $\alpha$ of approximately 15 degrees below the horizontal axis as measured relative to the Lens Center. The third point may also be positioned at an angle $\tau$ of approximately 15 degrees below the horizontal axis as measured relative to the Lens Center.

According to various alternative embodiments, the first, second and third recesses have a depth of between 0.10 and 0.60 mm, and more preferably 0.30 mm.

In yet another embodiment, the lens further has first and second skirt zones positioned outside of the optic zone and on first and second sides of the vertical axis respectively. In one alternative embodiment, the first fiducial indicator is a first recess in the lens edge extending between first and second points along the lens edge, and the second fiducial indicator is second and third recesses in the lens edge positioned substantially adjacent one another and between third and fourth points around the lens edge. The first recess is located in the first skirt zone and the second and third recesses are located in the second skirt zone.

Also provided is a contact lens including a lens edge defining an outer periphery, an optic zone positioned within the lens edge designed to provide corrective vision for a patient, a Lens Center having a vertical axis and a horizontal axis passing through it, and a first recess in the lens edge at a first location and extending between first and second points along the lens edge, and a dual notch extending between third and fourth points along the lens edge and including adjacent second and third recesses at a second location around the lens edge that is different than the first location.

The lens may further include first and second skirt zones positioned outside of the optic zone on first and second sides of the vertical axis respectively, and the first recess and dual notch may be located in the first and second skirt zones respectively.

In one embodiment, the first recess and dual notch are located below the horizontal axis. Also provided is a contact lens having a lens edge defining an outer periphery, an optic zone positioned within the lens edge designed to provide corrective vision for a patient, and at least a first fiducial indicator present at a predetermined location around the lens edge. The first fiducial indicator is a recess into or projection extending outwardly from the lens edge.

In one embodiment, the first fiducial indicator is a recess having a depth of at least 0.10 mm, and more preferably at least 0.30 mm. Alternatively, the first fiducial indicator is a projection having a height of at least 0.10 mm, and more preferably at least 0.3 mm.

In one embodiment, the first and second fiducials indicators are both recesses positioned at first and second predetermined locations around the lens edge.

In an alternate embodiment, the first and second fiducial indicators are both projections positioned at first and second predetermined locations around the lens edge.

Also provided is a contact lens having a lens edge defining an outer periphery, and an optic zone positioned within the lens edge designed to provide corrective vision for a patient. The lens edge is curved around its entire periphery other than along a predetermined first portion where the lens edge is straight. In one embodiment, the first portion has a length between 1 and 8 mm, and more preferably approximately 5 mm.

In yet another embodiment, the predetermined location is such that the first portion is substantially parallel to a virtual vertical midline of the contact lens.

DETAILED DESCRIPTION OF THE INVENTION

Glossary

In the description and claims directed to the present invention, various terms may be used for which the following definitions will apply:

"Decentration Error" as used herein, refers to an orientation offset, often descried in terms of (x, y) coordinates, relative to a determined point upon a patient's eye, such as the pupil or iris center, or a limbal edge. For example, a Lens with Decentration Error may orient itself where only a fraction of the Optic Zone sits over pupil region and skewing the corrective power of the Lens.

"Fitting Lens" as used herein refers to a standard, preferably stabilized contact lens that is designed to aid a practitioner in determining lens position on the eye, or for selecting or designing a contact lens. The fitting lens may have stability and measuring points incorporated in the lens to assist with measuring the rotational position of the lens and the decentration of the lens in relation to the patient's eye.

"Eye Physiology" or "Human Eye Physiology" as referred to herein includes the patient's unique shape of the front portion of the eye (the "anterior chamber") for whom an ophthalmic lens may be generated/customized for best fit. This includes, but is not limited to properties of a patient's eyeball, eye lids, or tear function.

"Lens" as used herein refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

Figure 1:
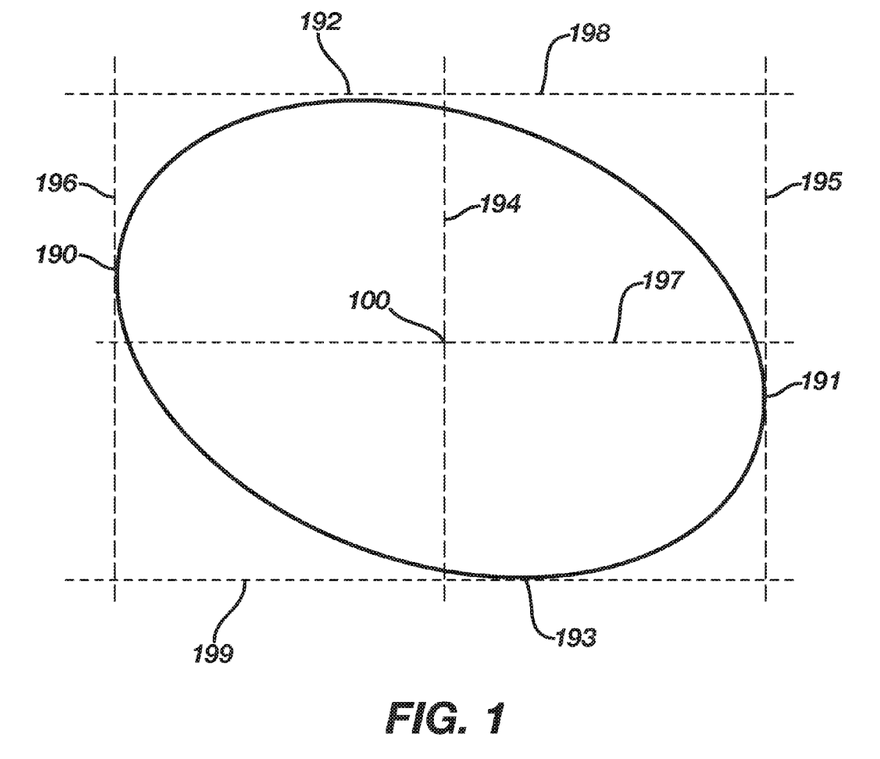
FIG. 1 graphically illustrates the meaning of the term "Lens Center" as used herein.

"Lens Center" as used herein, is the geometrical center of a round lens, or for a non-round lens can be determined as illustrated in FIG. 1 by establishing vertical tangent lines through the left-most 190 point of the lens, the right-most point 191 of the lens (oriented as if worn by a patient), and horizontal tangent lines through the upper-most point 192 of the lens, and the lower-most point 193 of the lens; drawing a virtual vertical axis 194 at the mid-point between right 195 and left 196 vertical tangent lines, and drawing a virtual horizontal axis 197 at the mid-point between upper 198 and lower 199 horizontal tangent lines. The point of intersection of the virtual vertical 194 and horizontal 199 axes is the "Lens Center" 100.

"Lens Design" as used herein, refers to form, function or both of a desired Lens, which if fabricated, may provide optical power correction, acceptable Lens fit (e.g., corneal coverage and movement), acceptable Lens rotation stability, etc. Lens Designs may be represented in either a hydrated or un-hydrated state, in Flat or Curved Space, in 2-dimensional or 3-dimensional space, and by a method including but not limited to, geometric drawings, power profile, shape, features, thicknesses etc. Lens Designs may contain data associated with a regularly or irregularly spaced grid.

"Lens Position Error" as used herein refers to a Lens which orients itself so that a patient suffers diminished fit, comfort, visual acuity, or any other desired aspect of a Lens. This includes, for example, a Lens oriented with Decentration Error or Rotation Error, or both. This may also include a Lens which loses stability as a result of eye movement or a patient's blinking dynamics. Any movement, either static or dynamic, that reduces the effectiveness of any aspect of the Lens may be considered a Lens Position Error.

"Optimal Lens Position" as used herein, refers to a lens positioned with no Rotation Error or Decentration Error relative to the needed corrective orientation of a Lens on an eye. Additionally, this term may refer to aspects of stability and variation, which may or may not, be the result of eye or eyelid movement.

"Rotation Error" as used herein, refers to a misalignment relative to an angular orientation that meets the needs of a patient's eye. For example, a Lens may orient itself upon a patient's eye at a 30 degree clockwise error, therefor skewing one or multiple of the corrective power axes.

Typically, a patient is given an eye exam as part of the process that an eye care practitioner uses to select a suitable contact lens for that patient. As indicated previously, however, a selected lens may not always behave as anticipated when actually placed on the eye due to the interaction between the lens and the patient's unique Eye Physiology, which may affect lens comfort, fit and/or vision when the lens is on the eye. The present invention provides a lens with edge features that enable a practitioner to measure and evaluate Lens Position Error. The presently disclosed edge features further provide a visual indicator to a patient when held in hand prior to insertion that assists in proper placement of the lens on the eye.

As previously noted, measuring and evaluating the position and rotation of a lens on a patient's eye can be done in any well-known manner, such as by using direct viewing methods with a slit lamp, photographic or video recording of the slit lamp image, or via images generated using corneal topographers, wavefront sensors, or any other suitable means. Recorded electronic images can readily be loaded into software that automatically detects the position of the lens on the eye and calculates Lens Position Error rather than relying on visual measurements. To do so either way, however, the practitioner must have a readily identifiable reference marker on the lens so that any movement of the lens relative to its ideal orientation on the eye can be determined. As indicated previously, fiducial marks placed on the front or back curve of the lens are known, but are disadvantageous in that they require additional manufacturing steps to place such marks on the lens.

Figure 2:
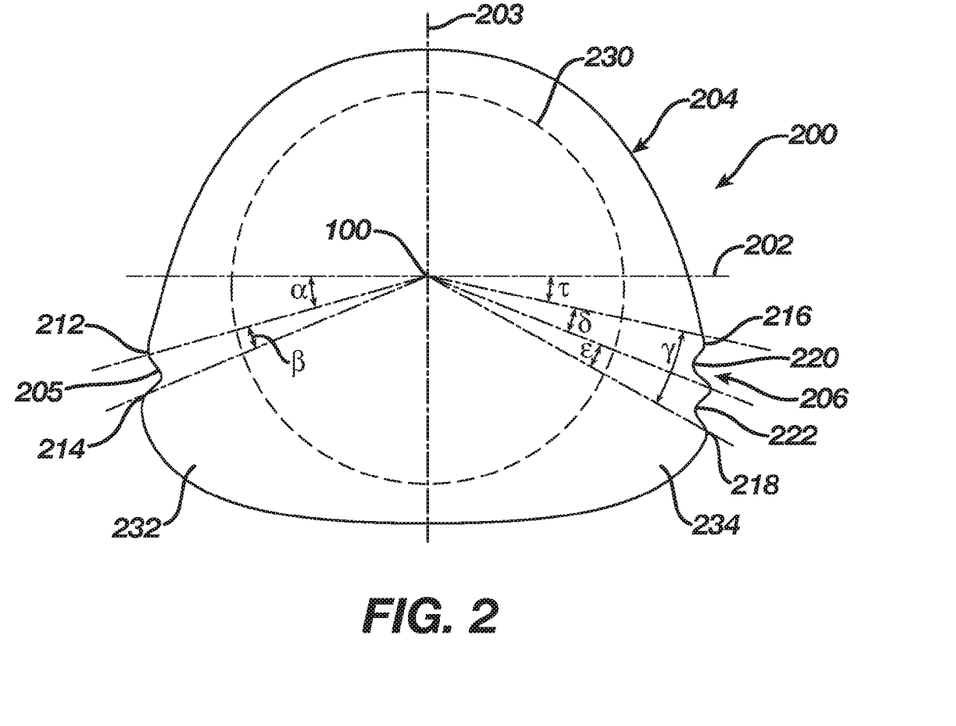
FIG. 2 illustrates one exemplary embodiment of a contact lens having fiducial indicators according to the present disclosure.

Referring now to a preferred embodiment illustrated in FIG. 2, a contact lens 200 is illustrated having an overall shape defined by the peripheral boundary of the lens or its "lens edge" 204. Positioned within the lens edge is the optic zone 230, which is the central part of the lens that contains the corrective power for the patient. The optic zone 230 shown in FIG. 2 is representative only, as it may be of various shapes and sizes (i.e., diameters) for any given patient. Typically, however, it is round in shape and approximately 5-9 mm in diameter and is completely inset from the lens edge. Lying within the optic zone is the Lens Center 100. The lens may further include skirt zones 232, 234 that are portions of the lens outside of the optic zone. In the illustrated embodiment, first and second skirt zones 232, 234 are present on first and second lateral sides respectively of the vertical axis 203 that passes through the Lens Center. As is also shown in the embodiment of FIG. 2, the first and second skirt zones respectively include a single notch 205 or recess in the lens edge, and a dual notch 206 or dual recesses in the lens edge.

Positioning the single and dual notches outside of the optic zone ensures that they will not in any way affect the patient's vision, which enables the edge features to be included in the final contact lens product if desired.

As further illustrated in the preferred embodiment of FIG. 2, the single notch 205 is positioned at a first location around the lens edge 204 and extends between first 212 and second 214 points along the lens edge. Preferably, the first point 212 is located at an angle α relative to the horizontal axis 202 that passes through the Lens Center 100 and the Lens Center that is approximately 15 degrees below the horizontal axis 202. Similarly, the dual recess or notch is positioned at a second location on an opposite side of the vertical axis 203, and extends between third 216 and fourth 218 points along the lens edge. The third point 216 is similarly located at an angle τ relative to the Lens Center and horizontal axis 202 that is approximately 15 degrees below the horizontal axis 202 as illustrated. Although a preferred embodiment is illustrated in FIG. 2 and described herein, the single and dual notches could be positioned at any location around the lens edge.

Preferably, the first 212 and second 214 points span an angle β of between 3 and 25 degrees, and more preferably approximately 10 degrees. Preferably, the third 216 and fourth 218 points span an angle γ of approximately 6 to 50 degrees, and more preferably 20 degrees. With regard to the dual notch, it consists of adjacent first 220 and second 222 recesses. Each of the first and second recesses are preferably approximately the same size, and each preferably spans an angle, δ and ε respectively, of between 3 and 25 degrees, and more preferably 10 degrees.

Figure 2A:
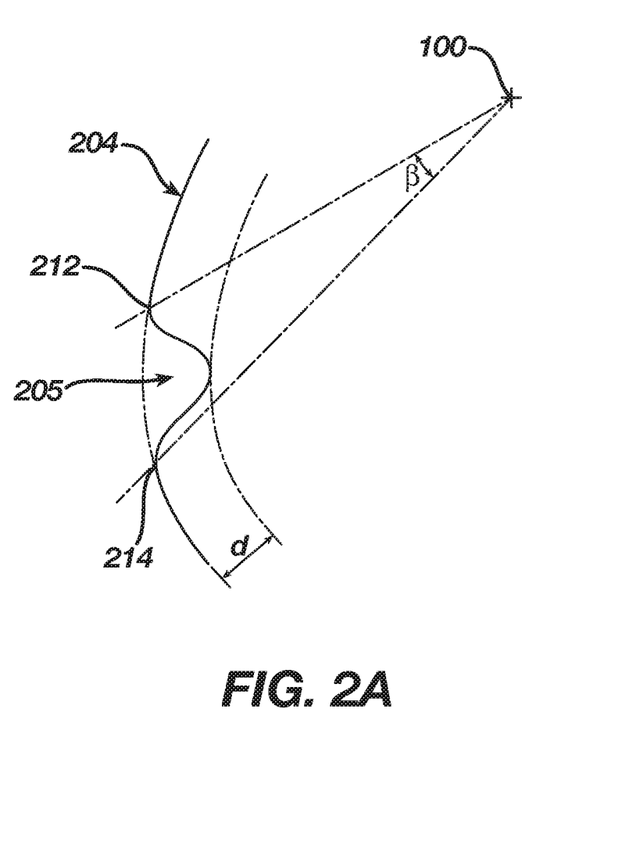
FIG. 2a is an enlarged illustration of the single notch or recess of FIG. 2.

FIG. 2a is an enlarged illustration of the single notch or recess of FIG. 2. The depth d of the single recess 205, preferably the dual recesses 220, 222, is preferably between 0.10 and 0.6 mm, and more preferably approximately 0.3 mm.

The preferred dimensions recited above are visible by the practitioner when examining and can easily be detected by computerized imaging systems that can detect the edge features as they are departures from the bulk curvature of the vast majority of the lens edge. Enhancement of the notches may be achieved via the use of UV cameras and detectors, of example. Once detected, the edge features can be analyzed relative to a template, or pattern, of the lens design and positioning intent, thereby allowing rotational offset and positioning errors to be calculated. They have the further advantage of being visible to the bare eye when not on the eye, such as when held by a patient prior to placement, to assist a patient in confirming correct orientation before placing the lens on the eye. Having different visual indicators (i.e., single and dual recesses) on different sides of the lens enables the patient to verify correct orientation of the lens before actually placing the lens on the eye. For example, knowing the configuration of the different lens edge features enables the patient to tell whether the lens is right side up or upside down. Further, the non-matching edge features also enable the patient to readily identify whether the contact lens is properly right side out or has flipped inside out. For example, in the illustrated embodiment, the contact lens is designed so that the dual notch is always on the right relative to the single notch when properly worn. Knowing this, the patient has a visual indication of whether the lens is right side up. Further, should the dual notches be present on the left when right side up, the patient will readily know that the lens is inside out and needs to be inverted before being placed on the eye.

Figure 3:
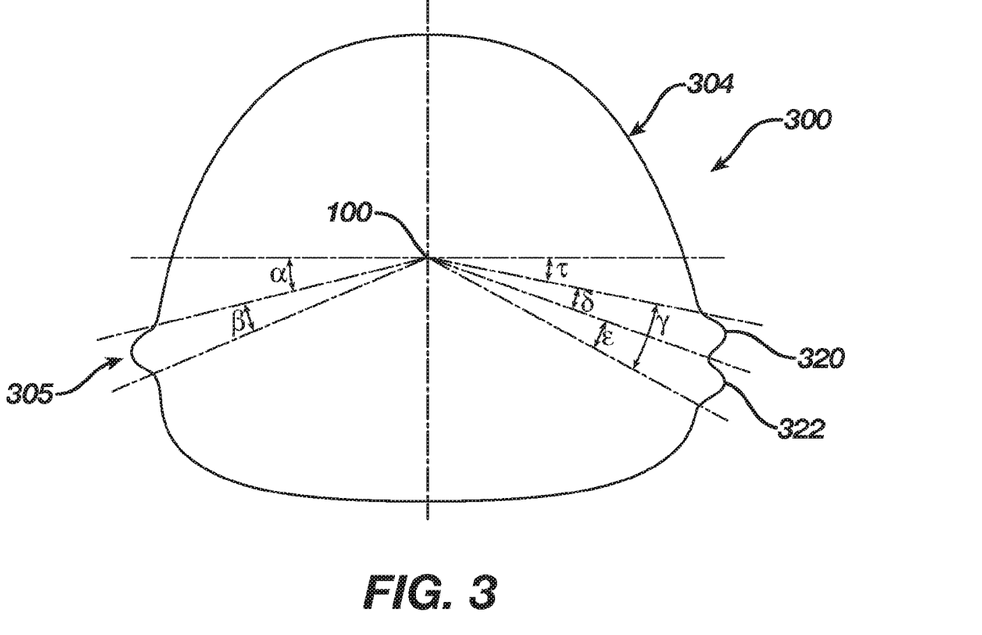
FIG. 3 illustrates an alternative exemplary embodiment of a contact lens having fiducial indicators according to the present disclosure.
Figure 3A:
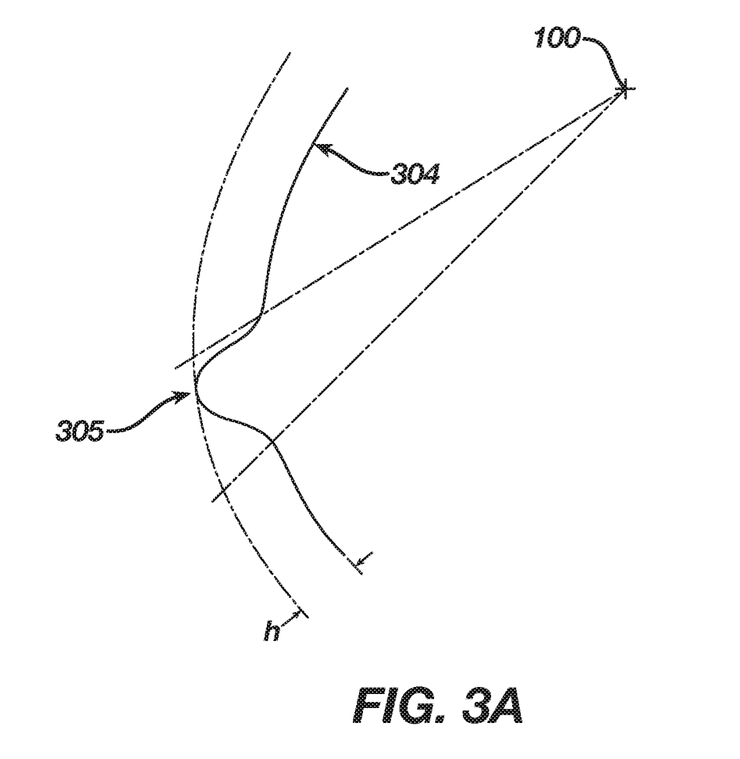
FIG. 3a is an enlarged illustration of the first projection of FIG. 3.
Figure 4:
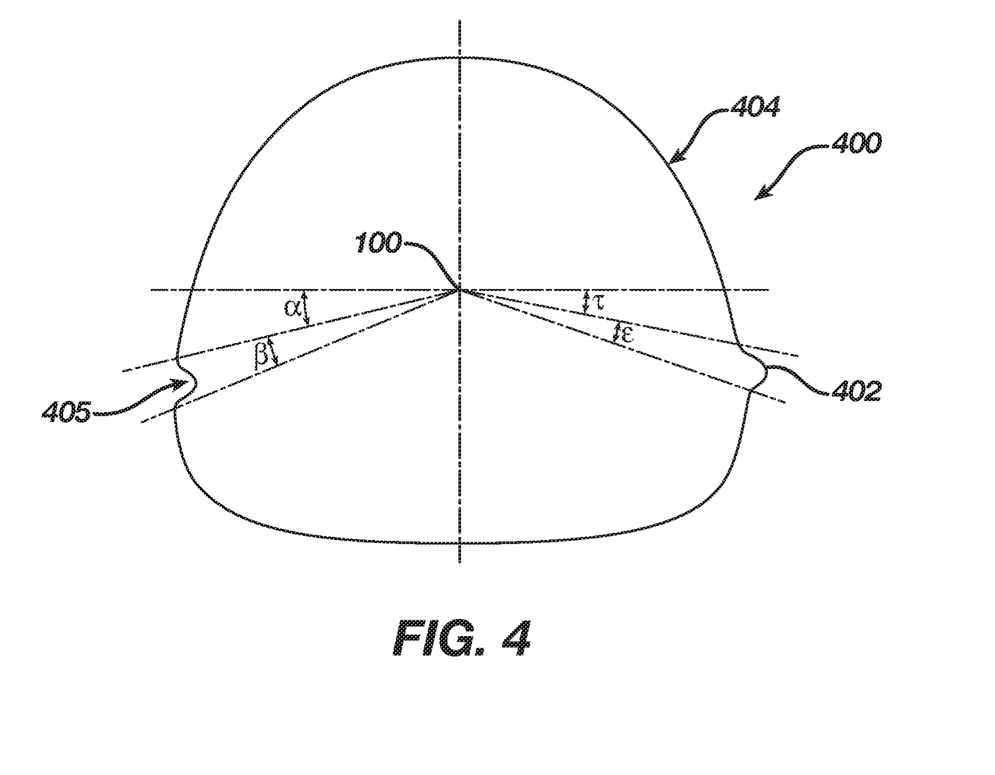
FIG. 4 illustrates another alternative exemplary embodiment of a contact lens having fiducial indicators according to the present disclosure.

FIGS. 3 and 4 illustrate various alternate configurations for fiducial indicators or markers that constitute recesses in, or projections outwardly from, the lens edge. FIG. 3 illustrates a contact lens 300 similar to that of FIG. 2, but with the first, second and third recesses replaced with first 305, second 320 and third 322 projections extending outwardly from the lens edge 304. FIG. 3a is an enlarged view of the single projection of FIG. 3 illustrating a height h of the projection. Height h is preferably between 0.1 and 0.6 mm, and more preferably approximately 0.3 mm.

FIG. 4 illustrates a contact lens 400 having a first recess 405 similar in nature to the first recess of FIG. 2, but with the dual notch of FIG. 2 replaced with a single projection 402. Various other embodiments and configurations formed into or extending outwardly from the lens edge are also possible so long as they are different in shape and/or configuration from one another and at different locations around the lens edge. Further, those skilled in the art will readily understand that another embodiment of the present invention may include either a single recess or a single projection around the lens edge rather than two having different shapes or configurations from one another. Having a single fiducial marker of this type enables visual assessment of Lens Position Error and also provides a visual indicator to facilitate proper placement by a patient.

Figure 5:
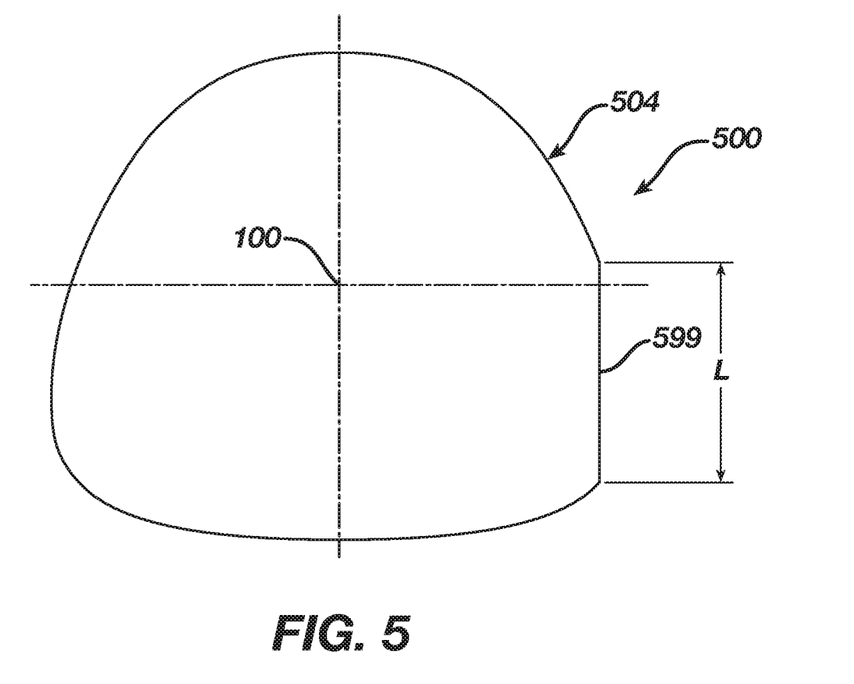
FIG. 5 illustrates an exemplary embodiment of a contact lens having a flat edge as a fiducial indicator according to the present disclosure.

FIG. 5 illustrates yet another embodiment of a lens 500 in which a fiducial marker or indicator around the lens edge 504 can be a flat edge or section 599 in the otherwise curved periphery that constitutes the lens edge. In a similar manner to the recesses and projections described above, the human eye and visualization software can readily distinguish discontinuities around the periphery of the otherwise curved lens edge. A flat edge 599 can be seen with the naked eye. Preferably, length L of flat edge 599 is between 1 and 8 mm, and more preferably 5 mm. The flat edge 599 may be located at any point around the lens edge, but preferably is located to the right or left of the vertical center line 510 such that the flat section extends in a substantially vertical direction as well.

Once the Lens Position Error is determined, it can be corrected with any one of various lens redesigns. Most significantly, the patient's vision correction can be improved by repositioning the optic zone relative to the remainder of the lens. This approach allows the lens to retain the same actual on-eye position with the optic zone moved to a location on the lens that will provide the patient with the designed vision correction.

Various other lens design changes may also selectively be leveraged to address Lens Position Error once it is known. For example, once positioning data has been obtained for a particular lens, an analysis of that data may allow for a design of a lens that incorporates an alternate base curve. The alternate base curve will interact differently with the patient's eye and eye lid, resulting in a different lens position than the first lens. Alternatively, a different diameter may also be subsequently chosen, which similarly may change the interaction with the patient's eye and eye lid therefore changing the resulting lens positioning.

In yet another example, skirt zones may be modified. Skirt zones are sometimes referred to as stabilization zones when they are designed to affect the stability and/or positioning of a lens on an eye. Typically, the standard or stock lenses from which each subsequent lens may be chosen have a finite number of stabilization zone options, if any at all. In a manufacturing process as set forth in U.S. Pat. No. 8,636,357, it may be possible to produce the stabilization zones to provide a custom fit for the patient. Once the positioning data is obtained and analyzed, a lens design may be produced that modifies one or all of the stabilization zones to result in optimal lens movement on the eye.

Although illustrative embodiments of the present invention have been described herein with reference to the accompanying drawings, it is to be understood that the invention is not limited to those precise embodiments and that various other changes and modifications may be effected herein by one skilled in the art without departing from the scope or spirit of the invention.

The invention claimed is:

1. A contact lens adapted to be placed on a patient's eye comprising:
   a substantially convex first surface and a substantially concave second surface, the concave surface having a shape substantially complementary to an exterior shape of said patient's eye and adapted to be placed on said patient's eye, the first and second surfaces meeting at a lens edge, said lens edge defining an outer periphery of said contact lens;
   an optic zone positioned within said lens edge, said optic zone designed to provide corrective vision for a patient when said contact lens is placed on said patient's eye; and
   a Lens Center having a vertical axis and a horizontal axis passing therethrough,
   wherein said periphery of said contact lens below said horizontal axis defines a non-round shape including first and second stabilization zones positioned outside of the optic zone on first and second lateral sides respectively of said vertical axis; and
      first and second fiducial indicators located within said first and second stabilization zones respectively and extending between said first surface and said second surface of said contact lens, said first and second fiducial indicators each comprising at least one recess into or at least one projection extending outwardly from said lens edge and being of a different shape from one another, wherein other than at a location of said first and second fiducial indicators, said lens edge forms a continuous convex outer periphery, said contact lens being further comprised of a substantially uniform composition throughout an entirety of said contact lens.

2. The contact lens according to claim 1, wherein said first fiducial indicator comprises at least one recess and said second fiducial indicator comprises at least one projection.

3. The contact lens according to claim 1, wherein said first fiducial indicator comprises a first recess in said lens edge, said recess extending between first and second points along said lens edge; and wherein said second fiducial indicator comprises second and third recesses in said lens edge, said second and third recesses being positioned substantially adjacent one another and between third and fourth points around said lens edge.

4. The contact lens according to claim 3, wherein the first and second points are located on a first lateral side of said vertical axis within an angle β of 3-25 degrees measured relative to the Lens Center.

5. The contact lens according to claim 4, wherein the third and fourth points are located on an opposite side of the vertical axis from the second and third points and within an angle γ of 6-50 degrees measured relative to the Lens Center.

6. The contact lens according to claim 5, wherein the first point is positioned an angle α of approximately 15 degrees below the horizontal axis as measured relative to the Lens Center.

7. The contact lens according to claim 6, wherein the third point is positioned at an angle τ of approximately 15 degrees below the horizontal axis as measured relative to the Lens Center.

8. The contact lens according to claim 3, wherein the first, second and third recesses have a depth of between 0.10 and 0.60 mm.

9. The contact lens according to claim 8, wherein the first, second and third recesses have a depth of approximately 0.30 mm.

10. The contact lens according to claim 1, wherein the first fiducial indicator comprises a first recess in said lens edge, said recess extending between first and second points along said lens edge; and wherein the second fiducial indicator comprises second and third recesses in said lens edge, said second and third recesses being positioned substantially adjacent one another and between third and fourth points around said lens edge, and wherein said first recess is located in said first stabilization zone and said second and third recesses are located in said second stabilization zone.

11. A contact lens adapted to be placed on a patient's eye comprising:
a substantially convex first surface and a substantially concave second surface, the concave surface having a shape substantially complementary to an exterior shape of said patient's eye and adapted to be placed on patient's eye, the first and second surfaces meeting at a lens edge, said lens edge defining an outer periphery of said contact lens;
an optic zone positioned within said lens edge, said optic zone designed to provide corrective vision for a patient when said contact lens is placed on said patient's eye;
a Lens Center having a vertical axis and a horizontal axis passing therethrough,
wherein said periphery of said contact lens below said horizontal axis defines a non-round shape including first and second stabilization zones positioned outside of the optic zone on first and second lateral sides respectively of said vertical axis; and
a first recess in said lens edge at a first location within said first stabilization zone, said first recess extending between first and second points along said lens edge and extending between said first surface and said second surface of said contact lens; and
a dual notch comprising adjacent second and third recesses in said lens edge at a second location within said second stabilization zone, said dual notches extending between third and fourth points along said lens edge, wherein other than at a location of said first recess and dual notch, said lens edge forms a continuous convex outer periphery,
said contact lens being further comprised of a substantially uniform composition throughout an entirety of said contact lens.

12. The contact lens according to claim 11, wherein the first recess and dual notch are located below the horizontal axis.

13. A contact lens adapted to be placed on a patient's eye comprising:
a first convex surface and a second concave surface, the concave surface having a shape substantially complementary to an exterior shape of said patient's eye and adapted to be placed on said patient's eye, the first and second surfaces meeting at a lens edge, said lens edge defining an outer periphery of said contact lens;
an optic zone positioned within said lens edge, said optic zone designed to provide corrective vision for a patient when said contact lens is placed on said patient's eye;
a Lens Center having a vertical axis and a horizontal axis passing therethrough, wherein said periphery of said contact lens below said horizontal axis defines a non-round shape including first and second stabilization zones positioned outside of the optic zone on first and second lateral sides respectively of said vertical axis; and
only one fiducial indicator present at a predetermined location around said lens edge within either said first or second stabilization zones, said one fiducial indicator comprising a recess into or projection extending outwardly from said lens edge and extending between said first surface and said second surface of said contact lens, wherein other than at a location of said one fiducial indicator, said lens edge forms a continuous convex outer periphery,
said contact lens being further comprised of a substantially uniform composition throughout an entirety of said contact lens.

14. The contact lens according to claim 13, wherein said one fiducial indicator is a recess having a depth of at least 0.10 mm.

15. The contact lens according to claim 14, wherein the depth is at least 0.30 mm.

16. The contact lens according to claim 15, wherein said one fiducial indicator is a projection having a height of at least 0.10 mm.

17. The contact lens according to claim 16, wherein the height is at least 0.3 mm.

* * * * *